(12) United States Patent
Murano et al.

(10) Patent No.: US 8,369,716 B2
(45) Date of Patent: Feb. 5, 2013

(54) INTEGRATED WAVELENGTH SELECTABLE PHOTODIODE USING TUNABLE THIN FILM FILTERS

(75) Inventors: Robert Murano, Medford, MA (US);
John Hazell, Somerville, MA (US);
Wayne Sharfin, Lexington, MA (US);
Mark Lourie, Newburyport, MA (US);
Bei Wang, Acton, MA (US)

(73) Assignee: Aegis Lightwave, Inc., Woburn, MA (US)

( * ) Notice: Subject to any disclaimer, the term of this patent is extended or adjusted under 35 U.S.C. 154(b) by 900 days.

(21) Appl. No.: 12/037,040

(22) Filed: Feb. 25, 2008

(65) Prior Publication Data

US 2008/0205887 A1    Aug. 28, 2008

Related U.S. Application Data

(60) Provisional application No. 60/891,647, filed on Feb. 26, 2007, provisional application No. 60/971,247, filed on Sep. 10, 2007.

(51) Int. Cl.
*H04B 10/06* (2006.01)
*H04J 14/02* (2006.01)

(52) U.S. Cl. ............. 398/212; 398/83; 398/85; 398/202

(58) Field of Classification Search .................. 398/135, 398/138, 139, 202, 212, 214, 83, 85
See application file for complete search history.

(56) References Cited

U.S. PATENT DOCUMENTS

| | | | |
|---|---|---|---|
| 5,793,912 A | 8/1998 | Boord et al. | |
| 6,985,281 B2 | 1/2006 | Wagner et al. | |
| 7,049,004 B2 | 5/2006 | Domash et al. | |
| 7,071,566 B2 | 7/2006 | Cole et al. | |
| 7,304,799 B2 | 12/2007 | Ma et al. | |
| 7,329,853 B2 | 2/2008 | Cole et al. | |
| 7,369,776 B2 * | 5/2008 | Masahiko | 398/138 |
| 2002/0154357 A1 * | 10/2002 | Ozveren et al. | 359/124 |
| 2003/0072009 A1 * | 4/2003 | Domash et al. | 356/519 |
| 2003/0151818 A1 * | 8/2003 | Wagner et al. | 359/578 |
| 2004/0166817 A1 * | 8/2004 | Mokhtari et al. | 455/91 |
| 2006/0013541 A1 * | 1/2006 | Plickert et al. | 385/89 |
| 2006/0133802 A1 * | 6/2006 | Tian et al. | 398/4 |

OTHER PUBLICATIONS

"Notification of Transmittal of The International Search Report and The Written Opinion of The International Searching Authority, or the Declaration" for PCT/US08/02433, Jun. 25, 2008, 9 pages, The International Searching Authority/US, Alexandria, VA, USA.

"Notification Concerning Transmittal of International Preliminary Report on Patentability (Chapter I of The Patent Cooperation Treaty" for PCT/US2008/002433, Sep. 3, 2009, 7 pages, The International Bureau of WIPO, Geneva, Switzerland.

(Continued)

*Primary Examiner* — Kenneth N Vanderpuye
*Assistant Examiner* — Daniel Dobson
(74) *Attorney, Agent, or Firm* — Kurt Rauschenbach; Rauschenbach Patent Law Group, LLP

(57) ABSTRACT

An integrated wavelength selectable photodiode includes a device package having an input that receives an optical signal. A set-and-hold, thermally tunable thin-film filter is positioned in the device package and includes an input that is optically coupled to the input of the device package. The set-and-hold, thermally tunable thin-film filter passes light with a predetermined optical bandwidth to an output. An optical element collimates an incident optical beam onto the input of the set-and-hold, thermally tunable thin-film filter. A detector is positioned in the device package and includes an input that is optically coupled to the output of the set-and-hold, thermally tunable thin-film filter. The detector detects data received by the integrated wavelength selectable photodiode.

25 Claims, 15 Drawing Sheets

OTHER PUBLICATIONS

Hohlfeld, et al., A Thermally Tunable, Silicon-Based Optical Filter, Sensors Actuators, 2003, pp. 93-99, vol. 103, Elsevier.

"Office Action" for Chinese Patent Application No. 200880006180.7, Jan. 12, 2011, 5 pages, State Intellectual Property Office of The People's Republic of China, China.

"Response to First Office Action" for Chinese Patent Application No. 200880006180.7, 13 pages, filed on Apr. 20, 2011 in the State Intellectual Property Office of The People's Republic China, Beijing, China.

"Second Office Action" for Chinese Patent Application No. 200880006180.7, 6 pages, issued on May 11, 2011 in the State Intellectual Property Office of The People's Republic China, Beijing, China.

"Response to Second Office Action" for Chinese Patent Application No. 200880006180.7, 6 pages, filed on Sep. 9, 2011 in the State Intellectual Property Office of The People's Republic China, Beijing, China.

* cited by examiner

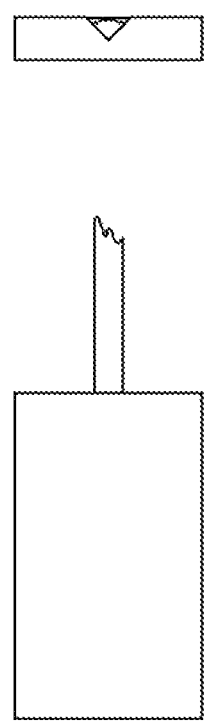
FIG. 2B
FIG. 2B-1
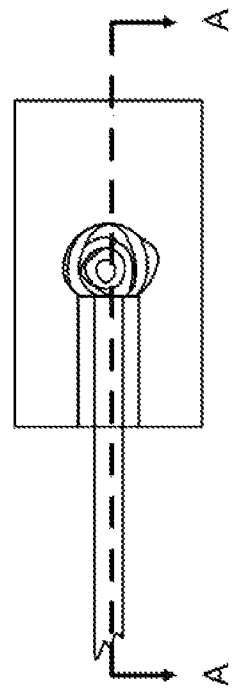
FIG. 2B-2
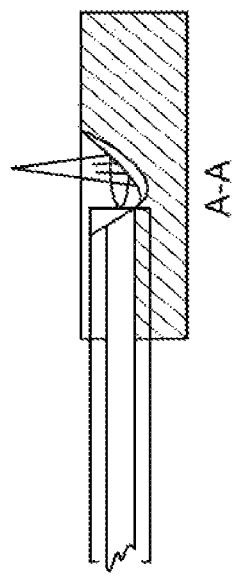
FIG. 2B-3

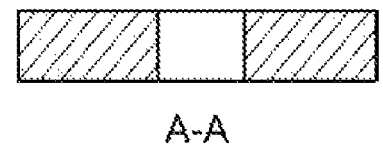
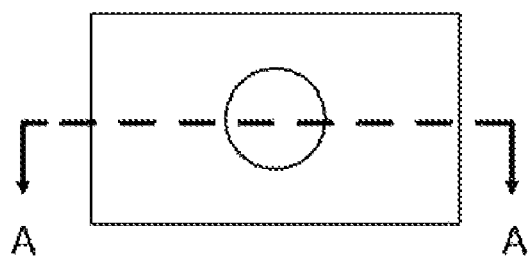
FIG. 2C
FIG. 2C-1

Thin Membrane

INTEGRATED WAVELENGTH SELECTABLE PHOTODIODE USING TUNABLE THIN FILM FILTERS

RELATED APPLICATION SECTION

This application claims priority to U.S. Provisional Patent Application Ser. No. 60/891,647, filed Feb. 26, 2007, entitled "Integrated Wavelength Selectable Photodiode Using a Tunable Filter." This application also claims priority to U.S. Provisional Patent Application Ser. No. 60/971,247, filed Sep. 10, 2007, entitled "Wavelength Selectable Photodiode Using a Tunable Filter. The entire specification of U.S. Provisional Patent Application Ser. No. 60/891,647 and U.S. Provisional Patent Application Ser. No. 60/971,247 are incorporated herein by reference.

The section headings used herein are for organizational purposes only and should not be construed as limiting the subject matter described in the present application.

BACKGROUND OF THE INVENTION

Demand for bandwidth is driving the expansion of optical transmission systems into homes and businesses of all sizes. Single wavelength fiber optic systems can support substantial data rates. However, services such as HDTV, on-demand TV programming, internet telephony, and telepresence are bandwidth intensive beyond the capabilities of many traditional networks. The present invention relates to integrated wavelength selectable photodiodes and their application to Fiber-To-The-X (FTTX) services. Fiber-To-The-X services refer to the extension of optical data transport into areas traditionally served by electrical communications systems, such as homes and small and medium sized businesses. Examples of FTTX systems are Fiber-To-The Home (FTTH), Fiber-To-The Curb (FTTC) and Fiber-To-The-Premises. FTTX architectures are also used for some highly secure optical communications links, such as radar tower interfaces.

BRIEF DESCRIPTION OF THE DRAWINGS

The aspects of this invention may be better understood by referring to the following description in conjunction with the accompanying drawings. Identical or similar elements in these figures may be designated by the same reference numerals. Detailed description about these similar elements may not be repeated. The drawings are not necessarily to scale. The skilled artisan will understand that the drawings, described below, are for illustration purposes only. The drawings are not intended to limit the scope of the present teachings in any way.

FIG. 2B illustrates the fiber holder/mirror element in the low-cost package shown in FIG. 2A.

FIG. 2B-1 illustrates a cross-sectional view of the fiber holder/mirror element of FIG. 2B that shows a V-groove structure that holds the fiber/mirror element securely in place.

FIG. 2B-2 shows a top cross-sectional view of the fiber/mirror element of FIG. 2B.

FIG. 2B-3 shows a side cross-sectional view of the fiber/mirror element of FIG. 2B.

FIG. 2C illustrates a cross-sectional view of a spacer element that can be used with the low-cost package shown in FIG. 2A.

FIG. 2C-1 shows a cross-sectional view of line A-A through the spacer element shown in FIG. 2C.

FIG. 2D-1 illustrates a cross-sectional view of the integrated filter chip shown in FIG. 2D along line A-A.

FIG. 2D-2 illustrates a cross-sectional view of the integrated filter chip shown in FIG. 2D along line B-B.

FIG. 3 illustrates a block diagram of an embodiment of an optical network unit which includes a wavelength selectable photodiode according to the present invention that can provide premium services to a subscriber.

DETAILED DESCRIPTION

Figure 1A:
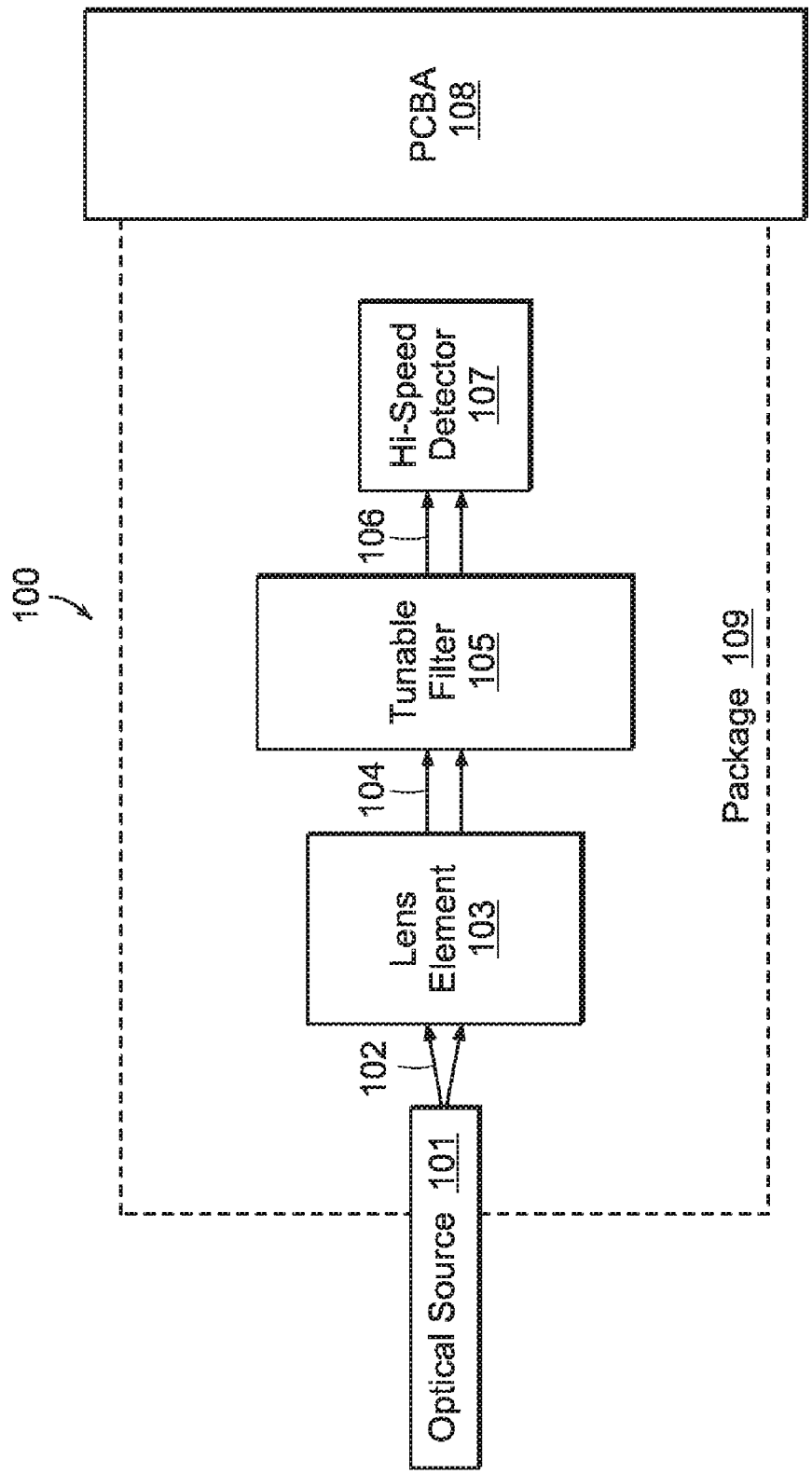
FIG. 1A illustrates a block diagram of an integrated wavelength selectable photodiode according to the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

It should be understood that the individual steps of the methods of the present invention may be performed in any order and/or simultaneously as long as the invention remains operable. Furthermore, it should be understood that the apparatus and methods of the present invention can include any number or all of the described embodiments as long as the invention remains operable.

The present teachings will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Those of ordinary skill in the art having access to the teachings herein will recognize additional implementations, modifications, and embodiments, as well as other fields of use, which are within the scope of the present disclosure as described herein. For example, although the integrated wavelength selectable photodiodes are described in connection Fiber-To-The-X (FTTX) services, it should be understood that the integrated wavelength selectable photodiodes according to the present invention can be used for any application.

Emerging demand for services, such as HDTV, on-demand programming, and telepresence services, has led data-service providers and system manufacturers to introduce PON architectures using DWDM to keep pace with demand in FTTX applications. Unfortunately, presently available wavelength-agile technologies used in DWDM backbone networks are not able to meet the severe cost constraints of an end-user market. Therefore, migration to multi-wavelength systems in FTTX has until now focused on DWDM-PON systems in which all wavelengths are broadcast to all receivers and a static filter is used to select the appropriate channel. See, for example, M. Abrams, et al., "FTTP Deployments in the United States and Japan—Equipment Choices and Service Provider Imperatives", Journal of Lightwave Technology, vol. 23, no. 1, pp. 236-246, January 2005.

However, in order to fully realize the operational benefits of such DWDM-PON systems, the ability to dynamically provision wavelengths at both the ONU and ONT is needed. Tunable filters at the receiver have been identified as a possible solution to this challenge. See, for example, H. Suzuki, et al., "A Remote Wavelength Setting Procedure based on Wavelength Sense Random Access (λ-RA) for Power-Splitter-Based WDM-PON", ECOC 2006, Paper We3.P.157. One aspect of the present invention relates to a dynamically reconfigurable receiver based on a tunable filter.

Recent standards issued by the International Telecommunications Union (ITU) standards organization have established the "enhancement band," which is a range of wavelengths between 1550 and 1560 nm for use in DWDM PON systems. The use of the term "enhancement band" refers to any wavelength that may be used with the present invention to increase transmission bandwidth and should not be construed as limiting the scope of present invention to function within only the aforementioned wavelength range.

One aspect of the present invention relates to low-cost, reliable and manufacturable hardware solutions for enabling flexibility in FTTX networks. In some embodiments, these hardware solutions make use of this enhancement band. Optoelectronic components according to the present invention enable flexible high-bandwidth network architectures. In some embodiments, optoelectronic components according to the present invention are available to enable wavelength control at or near the end user node with minimal cost.

More specifically, a system according to the present invention is capable of selecting a single wavelength from an optical fiber carrying a plurality of wavelengths. In addition, the detector also detects data carried in the optical signal and converts the data to electrical signals. The electrical signals can then be routed to network devices in a desired manner. For example, the electrical signals can be routed to network devices within a home or can be routed to a larger distribution point upstream in the network. In many embodiments, the detector can be manufactured for very low cost.

An integrated wavelength selectable photodiode according to the present invention can achieve a sufficient dynamic selection of wavelengths for many applications, with relatively small size and at a relatively low cost by using tunable thin-film filters. In many applications, these tunable thin-film filters are formed of semiconductor materials, such as hydrogenated amorphous silicon.

FIG. 1A illustrates a block diagram of an integrated wavelength selectable photodiode 100 according to the present invention. An optical source 101 is shown that generates an optical beam 102 in the direction of the wavelength selectable photodiode 100. In some embodiments, the optical source 101 includes a single or multimode optical fiber that guides an optical beam through an end of the optical fiber. In these embodiments, the optical fiber may be combined with the lens, or other beam-shaping optical element 103 that is positioned near the end of the optical fiber. Alternatively the optical fiber can be incorporated into a monolithic lensed fiber tip. In other embodiments, the optical source is a free-space optical source that is suitable for use in point-point free-space optical communications links.

The wavelength selectable photodiode 100 also includes an optical element 103 that shapes and steers the optical beam. In various embodiments, the optical element 103 can be positioned inside and/or outside the package 109. The optical element 103 shapes the optical beam into a collimated optical beam 104. In one embodiment, the optical element 103 is a low-cost molded reflective (mirror) or refractive (lens) optical device. In some embodiments, the optical element 103 and the component package are molded as one integrated unit. Also, in some embodiments, the optical element 103 includes a plurality of individual lens elements. An optical isolator can be positioned between the optical source 101 and the optical element 103 to reduce the intensity of reflections that are coupled back into the optical source.

The wavelength selectable photodiode 100 also includes a tunable optical bandpass filter 105 that is positioned in the optical path of the collimated optical beam 104. The optical element 103 directs the collimated optical beam to the input of the tunable optical bandpass filter 105. The filter 105 is tuned (set) to the chosen signal wavelength so that only the desired optical signal passes through the filter 105, while other signals with wavelengths outside its passband are blocked. The filter may be operated in a manner such that it remains fixed (held) at the set wavelength. The tunable optical bandpass filter 105 transmits a filtered optical signal 106.

The tunable optical bandpass filter 105 can be constructed in many ways. In one embodiment, the tunable optical bandpass filter 105 is a thin film filter formed of semiconductor films, such as amorphous silicon and silicon nitride thin films. Such films can be manufactured using Plasma Enhanced Chemical Vapor Deposition (PECVD). One advantage of using PECVD is that the resulting films can have relatively low stress and defect density which make the films highly stable and reliable.

The tunable optical bandpass filter 105 is tunable in wavelength. In one embodiment, the tunable optical bandpass filter is tuned thermally. In this embodiment, the tunable optical bandpass filter 105 can include an integrated heater element, such as a sheet heater. The peak transmission wavelength of a tunable bandpass filter is changed by changing the current applied to the integrated heater element. There are numerous ways of making the tunable optical bandpass filter 105. The geometry of the substrate and film structure may make use of, island structures, and other known geometries which have thermal management properties that improve filter performance and/or lifetime.

There are numerous ways to construct the tunable filter stack in order to optimize the shape of the filter bandpass and the filter performance parameters, such as insertion loss. In some embodiments, the filter includes only one cavity. In other embodiments, the tunable filter stack is a multiple-cavity structure. Using multiple-cavity structures provide substantial flexibility to optimize the filter bandpass shape and performance for particular applications.

The wavelength selectable photodiode 100 also includes a high-speed photodiode 107 that is positioned to receive the filtered optical signal 106 at an input. The high-speed photodiode 107 converts the filtered optical signal into a corresponding electrical signal. The high-speed photodiode 107 is chosen to respond in the wavelength range of interest. For example, an indium gallium arsenide photodiode can be used for DWDM telecommunications applications where optical wavelengths in the range of 1.5-1.6 µm must be detected.

The high-speed photodiode 107 can be operated with a reverse bias voltage in order to minimize capacitance and maximize frequency response for applications that require electrical bandwidths which are greater than a few hundred MHz. In some embodiments, electrical conditioning and/or electrical amplification circuitry are used to process the signals generated by the high-speed photodiode 107 in order to improve signal integrity. The electrical conditioning and/or electrical amplification circuitry can be integrated on the same die as the photodiode 107.

In some embodiments, the high-speed photodiode 107 is positioned to minimize the amount of thermal radiation from the tunable optical bandpass filter 105 that is incident on the high-speed photodiode 107. For example, in one specific embodiment where the tunable optical bandpass filter 105 comprises a filter element and a sheet heater, the filter element can be positioned between the high-speed photodiode 107 and the sheet heater.

In some embodiments, a package 109 houses the various components of the wavelength selectable photodiode 101. The package 109 protects the components. Also, the package 109 can provide an interface to a printed circuit board assembly (PCBA) 108. The PCBA 108 can redirect electrical signals from the component package to a host board where the output of the high-speed detector 107 is processed for data content and monitored for feedback control of the tunable filter. The PCBA 108 can be designed to minimize noise and electrical attenuation at high frequencies. Amplification and conditioning circuitry may be incorporated into the PCBA 108.

The component package 109 must provide both optical and electrical access to the devices while offering protection from contaminants. The component package 109 may be hermetically sealed to maximize protection for the active subcomponents. To enable low-cost, high-volume manufacturing, molded plastic and/or ceramics may be used, as well as chip-scale packaging. For example, see U.S. Pat. No. 6,985,281, which is assigned to the present assignee. The complete wavelength selectable photodiode can be relatively small in size and relatively low-cost because thousands of tunable filters are simultaneously fabricated on a single wafer.

In one embodiment, the component package 109 is a standard TO46 package, which is widely used in the industry. Such a package is relatively small and inexpensive. In various other embodiments, the component package 109 is smaller than a TO46 package. One aspect of the present invention is that a thermally tunable filter and a detector can be integrated into a relatively small package. Prior art devices that include mechanically tunable filters are too large to fit into such packages. Mechanically tunable filters are typically much larger than thermally tunable thin-film filters.

The wavelength selectable photodiode with a tunable, thin-film filter according to the present invention can detect data propagating in a single optical channel by using a thermally tunable, thin-film filter comprising various types of semiconductor films, such as silicon films, and/or various types of dielectric films, such as silicon nitride. The thermally tunable, thin-film filter isolates the spectral region of interest from optical signals or noise at other wavelengths. This isolated optical signal can then be detected by a high-frequency detector.

In operation, the optical source 101 provides an optical beam to the input of the optical element 103. The optical element 103 collimates and directs the optical beam to the input of the tunable filter 105. The tunable filter 105 is adjusted to the desired wavelength so as to pass the desired optical bandwidth. The high-speed detector 107 detects the desired optical beam.

In some embodiments, the tunable filter 105 is a set-and-hold type filter. In this embodiment, the tunable filter 105 can be set to any wavelength within a range defined by its starting wavelength and the maximum reliable operating temperature for its constituent materials. The tunable filter 105 may then be held at the set wavelength.

In some embodiments, the tunable filter 105 may be locked to the wavelength of interest using a feedback control loop which monitors the DC power level of the signal, or by using any one of numerous other servo-locking techniques known in the art. For example, a tunable filter can be locked to any channel within a range by stepping the drive power up and down and monitoring the signal intensity transmitted by the tunable filter to the photodetector (dither control). Thermally tunable filters work well in channel-locking applications. In contrast, mechanical structures are not ideal for dithering applications where they may rapidly age from repeated cycling.

In other embodiments, the tunable filter 105 is operated in a mode where it is scanned across the optical spectrum of interest to determine which channels are present, and to measure the power in each channel. A tunable filter manufactured by Aegis Lightwave, the assignee of the present invention, can be used in such a mode of operation.

The wavelength selectable photodiode of the present invention is well suited for applications that use multi-wavelength transmission architectures to transmit analog and/or digital signals. One particular application is where multiple data streams propagating on a single wavelength are provided to homes. In this application, the wavelength selectable photodiode of the present invention can be used to select from among these multiple data streams.

Figure 1B:
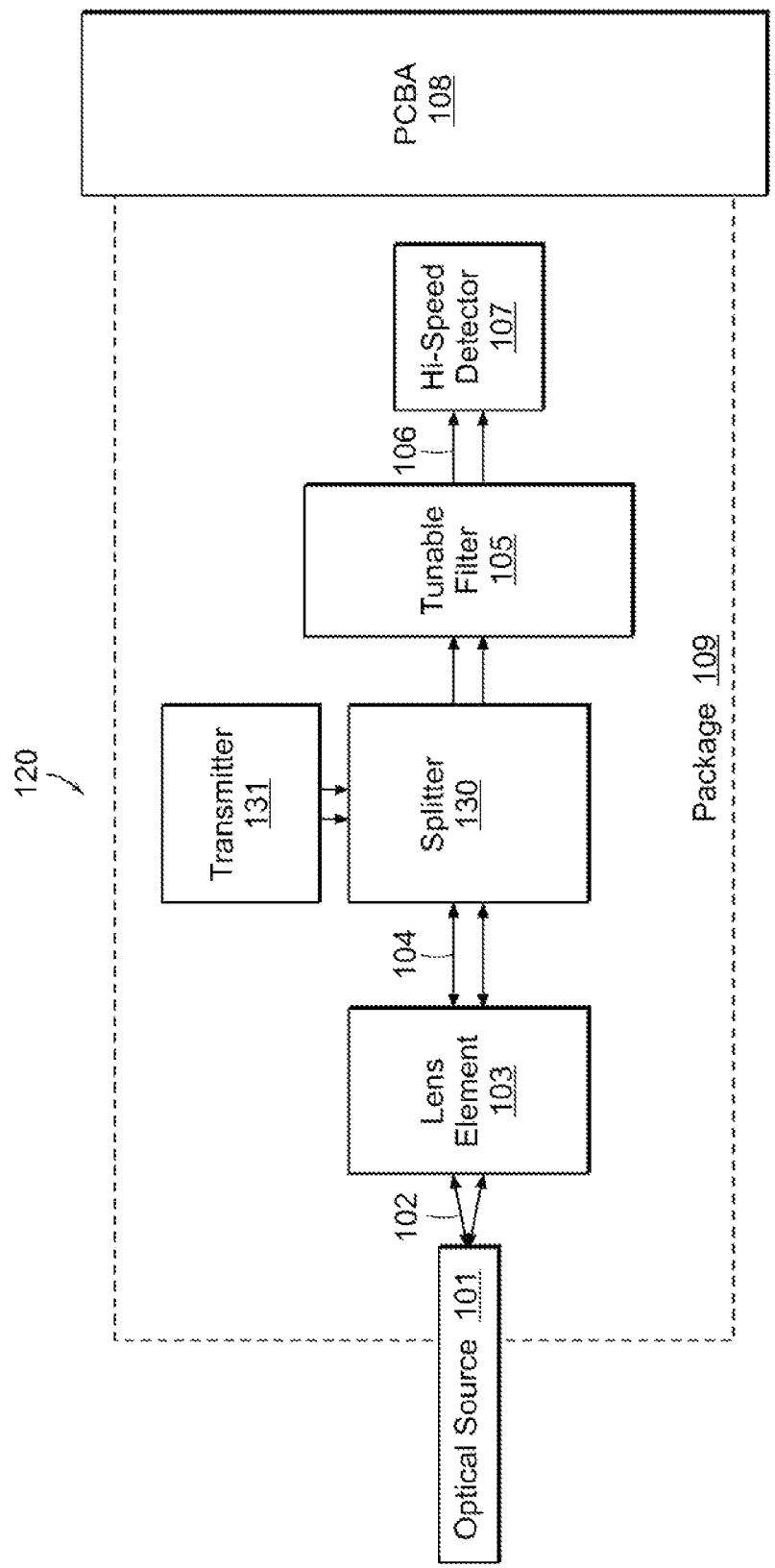
FIG. 1B illustrates a block diagram of an integrated wavelength selectable photodiode according to the present invention with an integrated transmitter 131.

FIG. 1B illustrates a block diagram of an integrated wavelength selectable photodiode 120 according to the present invention with an integrated transmitter 131. The integrated wavelength selectable photodiode 120 is similar to the integrated wavelength selectable photodiode 100 described in connection with FIG. 1A. However, the splitter/combiner 130 and a transmitter 131 are included. In various embodiments, the transmitter 131 can be a fixed wavelength transmitter or a tunable transmitter.

Figure 1C:
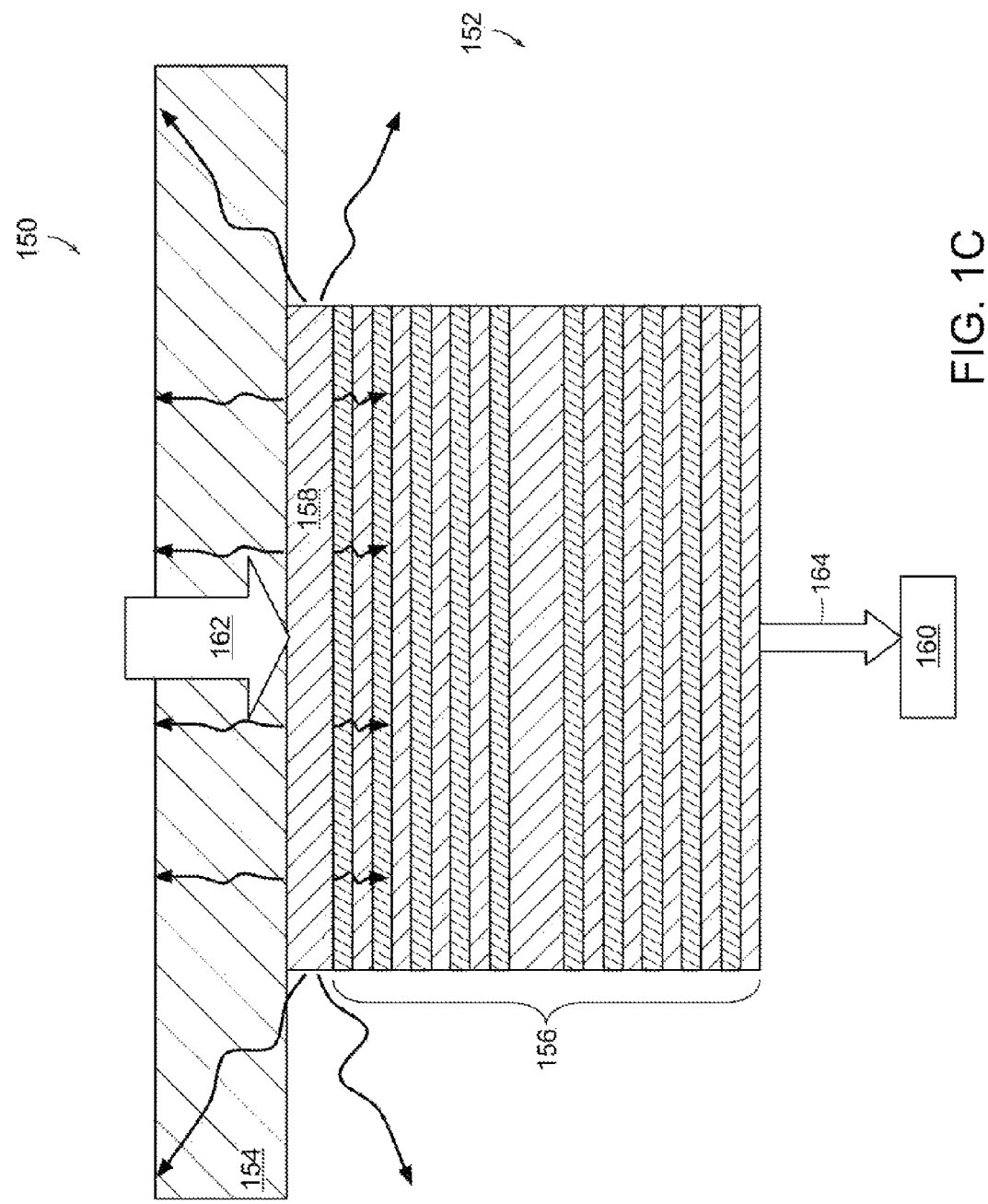
FIG. 1C illustrates a schematic diagram of an integrated wavelength selectable photodiode according to the present invention that includes a thermally tunable filter that has been mounted in a configuration which results in reduced thermal noise and an increased signal-to-noise ratio at the detector.

FIG. 1C illustrates a schematic diagram of an integrated wavelength selectable photodiode 150 according to the present invention that includes a thermally tunable filter 152 which has reduced thermal noise and an increased signal-to-noise ratio. The integrated wavelength selectable photodiode 150 includes a thermally tunable filter 152 having a supporting substrate 154 and a filter stack 156 that includes various layers of thin film material that form an optical filter. In addition, the thermally tunable filter 152 includes a heater layer 158 that controls the temperature and, therefore, the transmission properties of the filter stack 156. In one embodiment, the thermally tunable filter 152 is a set-and-hold filter. The integrated wavelength selectable photodiode 150 also includes a photodiode detector 160 that detects the filtered optical signal.

In operation, the incident optical signal 162 is filtered by the filter stack 156 and only the desired center wavelength and bandwidth of the thermally tunable filter 152 is passed through the filter stack 156. The temperature generated by the heater layer 158 defines the desired center wavelength and bandwidth. The filtered optical signal 164 with the desired center wavelength and bandwidth is then transmitted to the photodiode detector 160.

By positioning the thermally tunable filter 152 between the heater layer 158 and the photodiode detector 160, the amount of thermal radiation reaching the photodiode detector 160 is reduced. This configuration reduces the resulting noise substantially compared to a configuration where there is a transparent substrate between the heater layer 158 and the photodiode detector 160. When the heater layer 158 is at operating temperature, it emits blackbody radiation according to Planck's law. The blackbody radiation has two effects on the photodiode detector 160. First, the blackbody radiation adds to the background noise level of the optical signal because there is usually some emission in the wavelength range where the photodiode detector 160 is sensitive. Second, the blackbody radiation causes the temperature of the photodiode detector 160 to rise, resulting in increased thermal (Johnson) noise.

Figure 1D:
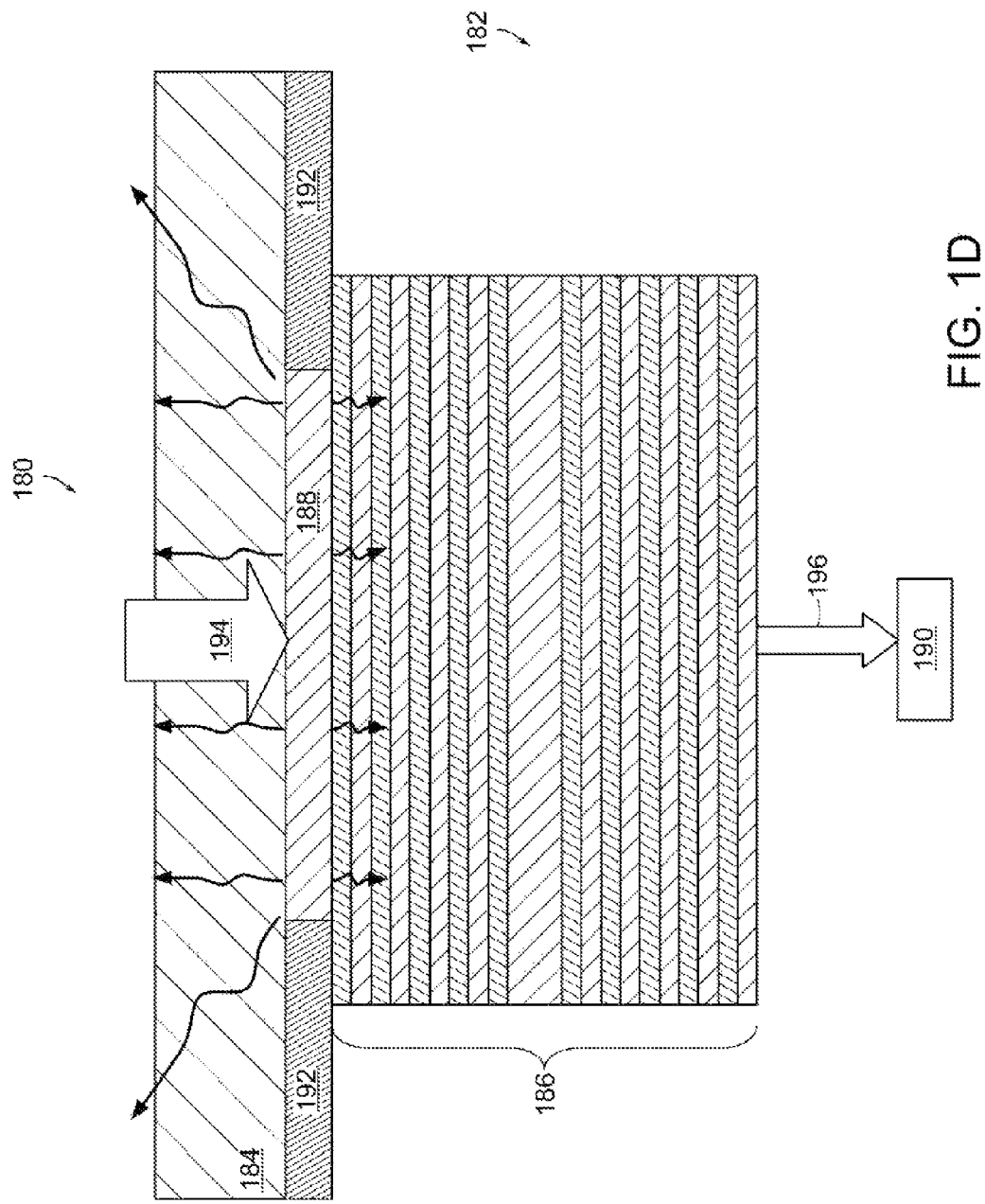
FIG. 1D illustrates a schematic diagram of another embodiment of an integrated wavelength selectable photodiode according to the present invention that includes a thermally tunable filter which has reduced thermal noise and an increased signal-to-noise ratio.

FIG. 1D illustrates a schematic diagram of another embodiment of an integrated wavelength selectable photodiode 180 according to the present invention that includes a thermally tunable filter which has reduced thermal noise and an increased signal-to-noise ratio. The integrated wavelength selectable photodiode 180 is similar to the integrated wavelength selectable photodiode 150 that was described in connection with FIG. 1C.

The integrated wavelength selectable photodiode 180 includes a thermally tunable filter 182 having a supporting substrate 184 and a filter stack 186 that includes various layers of thin film material that form an optical filter. In addition, the thermally tunable filter 182 includes a heater layer 188 that control the temperature and, therefore, the transmission properties of the filter stack 186. In one embodiment, the thermally tunable filter 182 is a set-and-hold filter. The integrated wavelength selectable photodiode 180 also includes a photodiode detector 190 that detects the filtered optical signal.

In addition, the integrated wavelength selectable photodiode 180 includes a blocking material 192 that masks the edges of the heater layer 188 from the photodiode detector 190. The blocking material 192 further reduces the amount of unfiltered radiation that reaches the photodiode detector 190. The blocking material 192 could be any material that provides a thermal barrier and which also absorbs optical radiation in the wavelength range where the photodiode detector 190 is sensitive. The blocking material 192 reduces the amount of black body radiation from the heater layer 188 that is incident on the photodiode detector 190.

The operation of the integrated wavelength selectable photodiode 180 is similar to the operation of the integrated wavelength selectable photodiode 150 shown in FIG. 1C. The incident optical signal 194 is filtered by the filter stack 186 and only the desired center wavelength and bandwidth of the thermally tunable filter 182 is passed through the filter stack 186. The temperature generated by the heater layer 188 defines the desired center wavelength and bandwidth. The filtered optical signal 196 with the desired center wavelength and bandwidth is then transmitted to the photodiode detector 160.

Figure 2A:
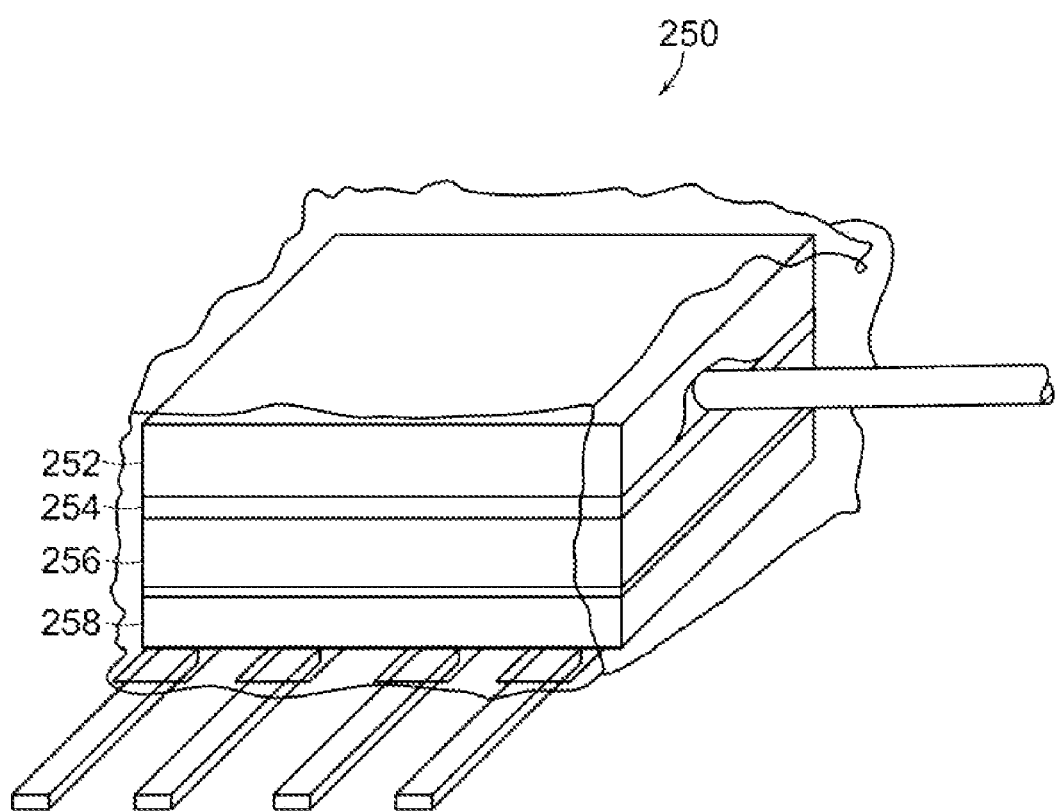
FIG. 2A illustrates a perspective view of a relatively low-cost package for a wavelength selectable photodiode according to the present invention that includes molded reflective optics.

FIG. 2A illustrates a perspective view of a relatively low-cost package 250 for a wavelength selectable photodiode according to the present invention that includes molded reflective optics. The package 250 can be used instead of a conventional manufactured component housing and circuit board assembly, which is much more expensive to manufacture.

Figure 2D:
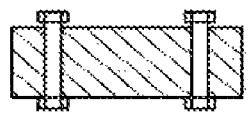
FIG. 2D illustrates a cross-sectional view of an integrated filter chip that can be used with the low-cost package shown in FIG. 2A.
Figure 2D:
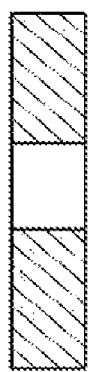
Figure 2D:
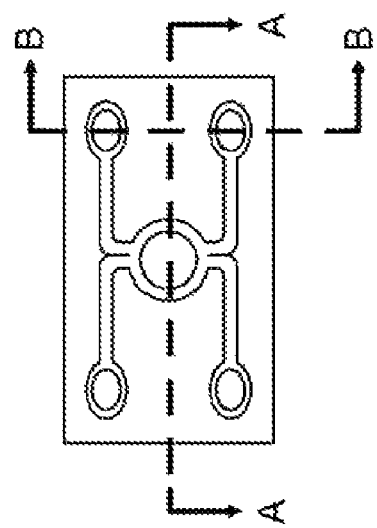
Figure 2E:
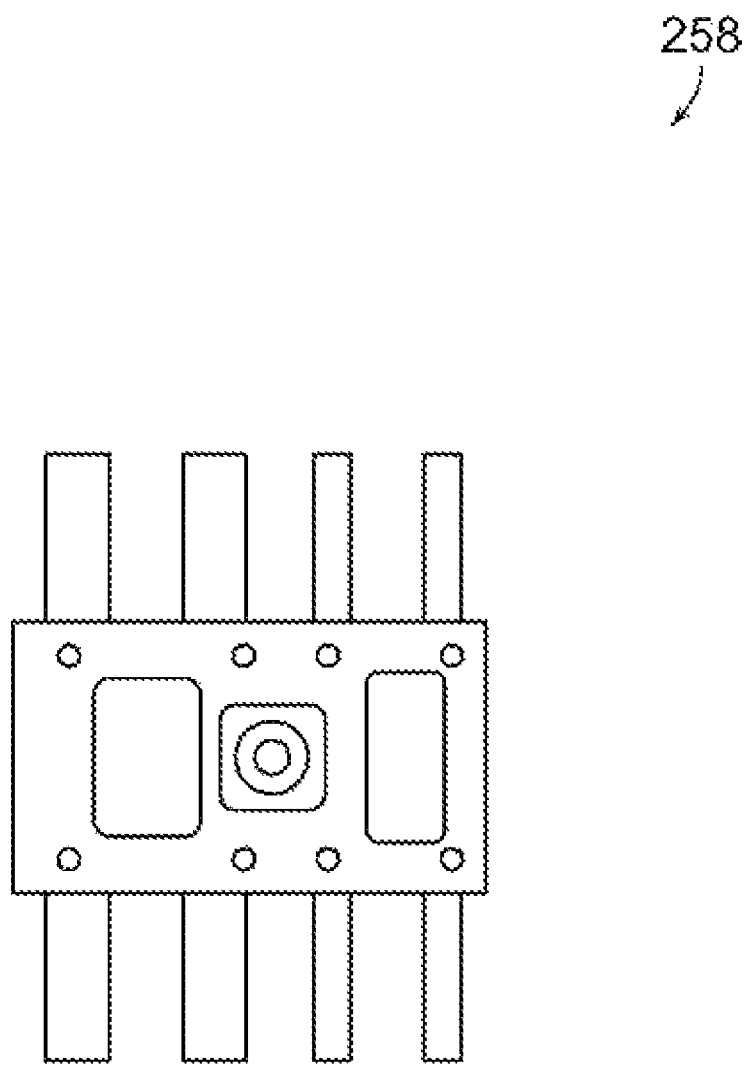
FIG. 2E illustrates a cross-sectional view of an electronics enclosure that can be used with the low-cost package.
Figure 3:
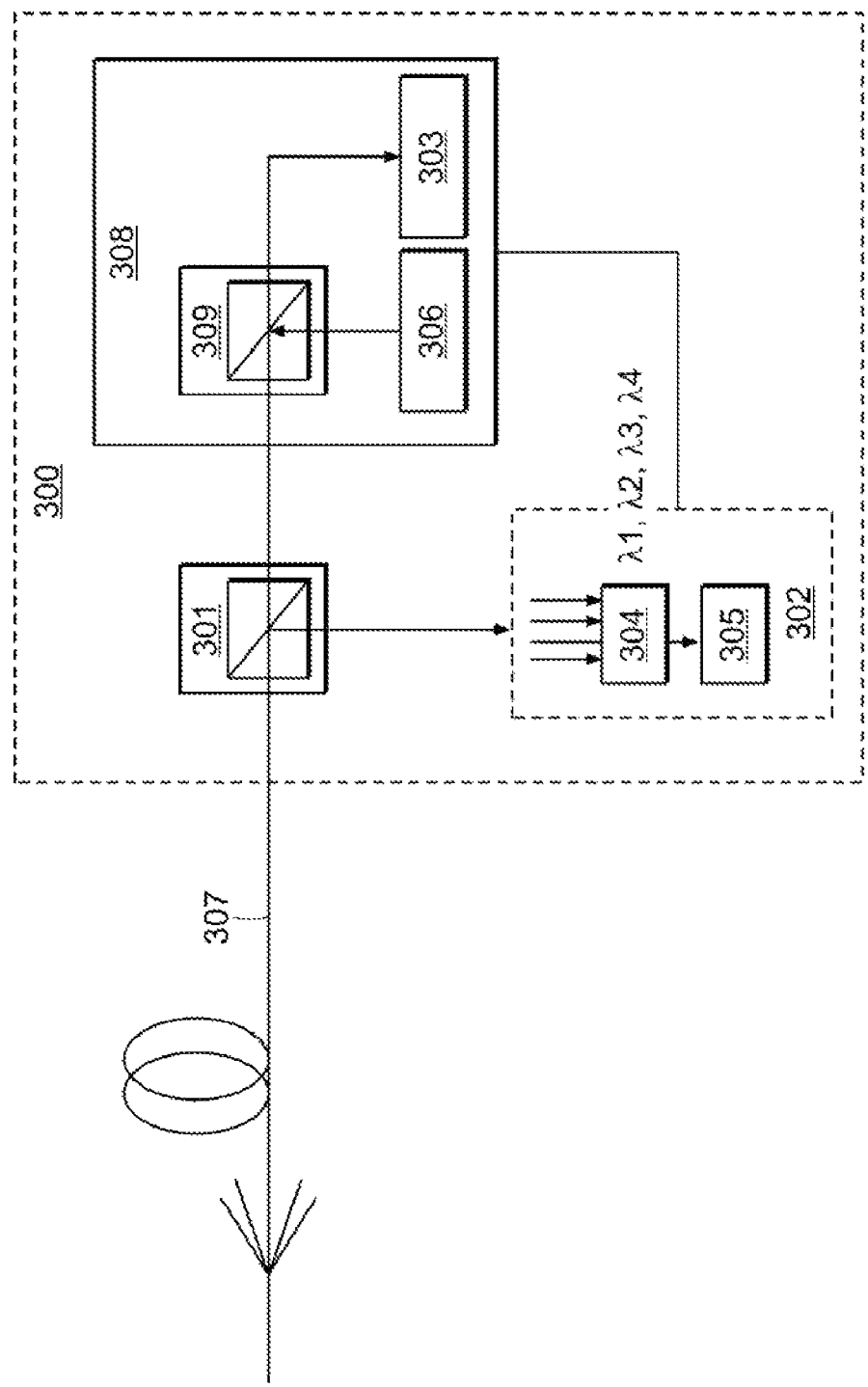

The package 250 includes a fiber holder/lens element 252. FIG. 2B illustrates the fiber holder/mirror element 252 in the low-cost package shown in FIG. 2A. FIG. 2B-1 illustrates a cross-sectional view of the fiber holder/mirror element 252 of FIG. 2B that shows a V-groove structure that holds the fiber/lens element securely in place. FIG. 2B-2 shows a top cross-sectional view of the fiber/mirror element of FIG. 2B. FIG. 2B-3 shows a side cross-sectional view of the fiber/mirror element of FIG. 2B. The fiber holder/mirror element 252 can be formed of metallized plastic, ceramic, micro-machined silicon (or glass) or any combination of these materials. For example, in one embodiment, the fiber holder/mirror element 252 is fabricated from low-cost, molded plastic. The area in front of the fiber optic is metallized to provide optimal performance when steering and shaping the optical beam.

In some embodiments, a separate spacer element 254 is used to isolate the fiber holder/mirror element 252. In other embodiments, the spacer element 254 is integrated into the fiber holder/lens element 252 or integrated into some other structure, such as the filter. FIG. 2C illustrates a cross-sectional view of a spacer element 254 that can be used with the low-cost package 250 shown in FIG. 2A. FIG. 2C-1 shows a cross-sectional view of line A-A through the spacer element 254 shown in FIG. 2C.

The package 250 also includes an integrated filter chip 256. In one embodiment, the integrated filter chip 256 is a membrane structure comprising an optical filter. FIG. 2D illustrates a cross-sectional view of an integrated filter chip 256 that can be used with the low-cost package 250 shown in FIG. 2A. The integrated filter chip 256 shown in FIG. 2D includes electrically conductive vias that pass current directly through the filter chip 256. FIG. 2D-1 illustrates a cross-sectional view of the integrated filter chip 256 shown in FIG. 2D, along line A-A. The top surface comprises the free-standing, thin-film filter membrane which remains after the substrate has been etched away beneath the filter. FIG. 2D-2 illustrates a cross-sectional view of the integrated filter chip 256 shown in FIG. 2D along line B-B.

In addition, the low-cost package 250 includes an electronics enclosure that supports electronic devices, such as amplification and filtering circuitry. Also, the electronics enclosure includes the necessary signal routing transmission lines to connect to the tunable filter. FIG. 2E illustrates a cross-sectional view of an electronics enclosure 258 that can be used with the low-cost package 250 shown in FIG. 2A.

FIG. 3 illustrates a block diagram of an embodiment of an optical network unit that includes a wavelength selectable photodiode according to the present invention that can provide premium services to a subscriber. FIG. 3 illustrates a block diagram of a DWDM PON optical network unit (ONU) 300 which includes a wavelength selectable photodiode 302 according to the present invention. The ONU 300 includes an enhancement-band filter 301 that directs wavelengths of light outside of the enhancement band to a first receiver 303 which in some embodiments may be contained in a diplexer 308 along with a transmitter 306. A diplexer is a well known device that processes signals having different wavelengths. The wavelengths within the enhancement band are directed to the wavelength selectable photodiode 302. The tunable filter 304 passes only the desired wavelength from within the enhancement band to a second receiver 305.

In one embodiment of the optical network unit 300, a transmitter 306 is included in the package as part of the diplexer 308. Numerous types of transmitters can be used. In some embodiments, the transmitter 306 is a fixed-wavelength transmitter. In other embodiments, the transmitter 306 is a tunable-wavelength transmitter. Using a tunable-wavelength transmitter improves the flexibility of the optical network unit 300.

A wavelength splitter/combiner 309 is used to couple the transmitter 306 to the optical fiber 307 in optical network units that propagate transmit and receive signals which have different wavelengths outside of the enhancement band. In optical network units where transmit and receive signals outside of the enhancement band are at the same wavelength, a simple power splitter/combiner may be used in place of the wavelength splitter/combiner 309. In one particular embodiment, the optical network unit 300 propagates downstream signal wavelengths near 1490 nm and upstream signal wavelengths near 1310 nm in addition to the wavelengths within the enhancement band.

In one embodiment, these components are used in a central office configuration. In the central office configuration, return signals from multiple ONUs are received by one or more Optical Line Terminations (OLTs). This embodiment is useful for applications requiring symmetric (equal transmit and receive) bandwidths.

In another mode of operation, the diplexer 308 sends signals to the optical line terminal at the service provider's central office to request a DWDM wavelength. The wavelength selectable photodiode 302 is then tuned to the wavelength designated by the optical line terminal. An on-demand download or other premium service is then transmitted by the optical line terminal and is received by the wavelength selectable photodiode 302 where it is passed to the receiver 305. For example, large movie files can be downloaded to a computer or DVR system. The diplexer 308 then signals the optical line terminal to release the wavelength after the download is complete.

Such architectures allow the receiver 403 to operate at full speed. Therefore, the architecture presented herein with the wavelength selectable photodiode 305 more efficiently uses the receiver bandwidth compared with prior art architectures that provide only a slotted amount of time for downloads or other premium services. In other words, such architectures provide the subscriber with full bandwidth downloads. Also, the architecture presented herein with the wavelength selectable photodiode 305 provides efficient use of optical line terminals so fewer optical line terminals can be used and/or optical line terminals can be brought on-line and taken off line as necessary. In another embodiment, the optical network unit shown in FIG. 3 can be configured to provide access to a shared high-bandwidth express download wavelength on demand.

Figure 4:
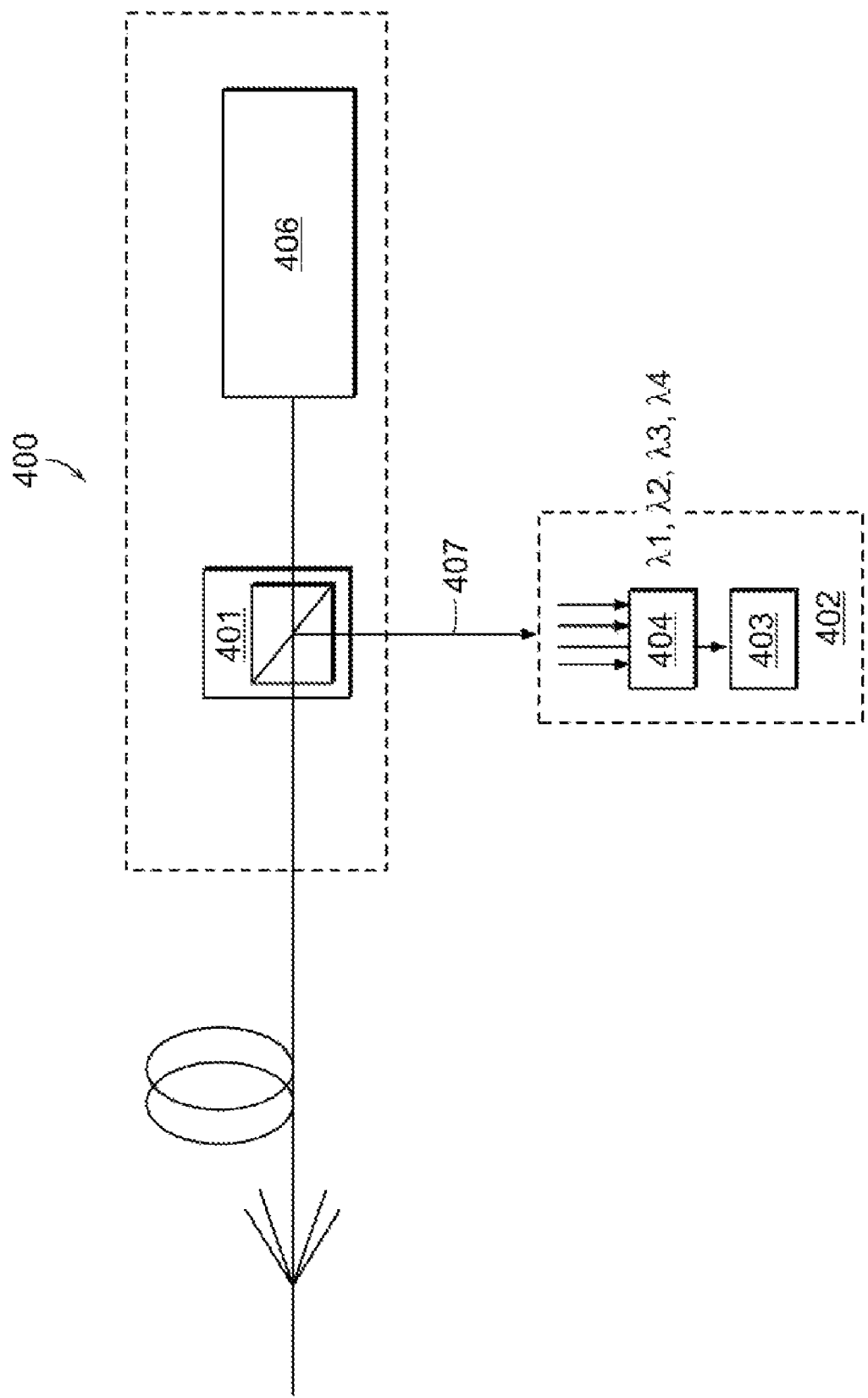
FIG. 4 illustrates a block diagram of another embodiment of the optical network unit which includes a wavelength selectable photodiode according to the present invention that can provide an upgrade port to upgrade a subscriber's services.

FIG. 4 illustrates a block diagram of another embodiment of the optical network unit 400 which includes a wavelength selectable photodiode 402 according to the present invention that can provide premium services to subscribers. The optical network unit 400 includes an enhancement band filter 401 with a passive splitter that is connected to an upgrade port 407. The enhancement band filter 401 passes a predetermined band of incoming optical signals to the upgrade port 407. If the subscriber has purchased a premium service, the premium service signals are coupled via an optical connection, which in some embodiments is an optical fiber, to a wavelength selectable photodiode 402 and then to a receiver 403.

In addition, the optical network unit 400 includes a diplexer 406. In various embodiments, the optical network unit 400 is electrically connected to the wavelength selectable photodiode 402. A diplexer is a well-known device that processes signals having different wavelengths. In the embodiment shown in FIG. 4, the 1490 nm optical signal is received from the optical network and is passed by the enhancement band filter 401 to the diplexer 406. The 1490 nm optical signal can be used for control and monitoring functions as well as for basic video and data services. The 1310 nm optical signal is generated by a transmitter in the diplexer 406 and then passed from the diplexer 406 through the enhancement band filter 401 and then back through the optical network to an optical line terminal (OLT) which may be located at a central office.

In one embodiment, the optical network unit 400 is used in a passive optical network architecture. Such passive optical network architectures use un-powered components to enable a single optical fiber to serve multiple subscribers. The diplexer 406 enables the optical network unit 400 to communicate with an optical line terminal at the service provider's central office. These PON network architectures reduce the amount of fiber and central office equipment required compared with point-to-point architectures.

Figure 5:
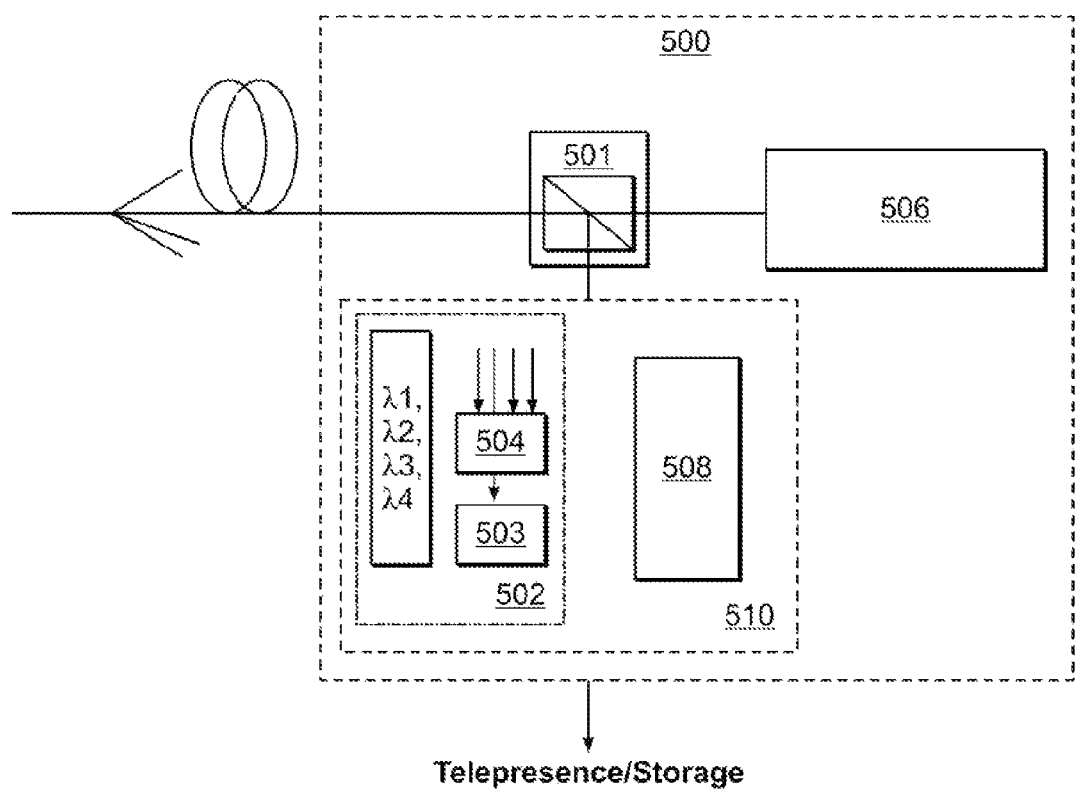
FIG. 5 illustrates a block diagram of another embodiment of the optical network unit which includes a wavelength selectable photodiode according to the present invention that can be configured as a symmetric point-to-point link.

FIG. 5 illustrates a block diagram of another embodiment of the optical network unit 500 which includes a wavelength selectable photodiode 502 according to the present invention that can be configured as a symmetric point-to-point link. The optical network unit 500 may also include an enhancement-band filter 501 similar to the enhancement-band filter 401 described in connection with FIG. 4. The enhancement-band filter 501 passes a predetermined band of incoming optical signals to the wavelength selectable photodiode 502 where they are filtered by the tunable filter 504 and then passed to the receiver 503.

In embodiments where an enhancement band filter is used, the optical network unit 500 also includes the diplexer 506 that was shown in FIGS. 3 and 4. The diplexer 506 can provide signals that are transmitted back to the optical line terminal at the service provider's central office to request certain transmissions or certain services. However, the diplexer 506 is not necessary in the embodiment shown in FIG. 5.

In addition, the optical network unit 500 includes a tunable transmitter 508 that transmits signals back to the optical line terminal at the service provider's central office. The tunable transmitter 508 is a dedicated transmitter that provides a way to transmit high-bandwidth signals back to the service provider's central office. There are many applications which require a dedicated transmitter, such as the transmitter 508. Such transmitters can provide symmetric bandwidth for enterprise applications. In some applications, such dedicated transmitters include a Reflective Silicon Optical Amplifier (RSOA) that receives incoming signals from the service provider and amplifies and re-modulates them before returning them to the service provider's optical line terminal. This allows the tunable transmit/receiver module 510 to operate without an internal optical source. In some applications, the signals transmitted back to the service provider's central office are then re-transmitted to a third party. For example, the optical network unit 500 can be used for teleconferencing or high bandwidth telepresence applications. Applications, such as teleconferencing and telepresence, can have symmetric bandwidth requirements.

Figure 6:
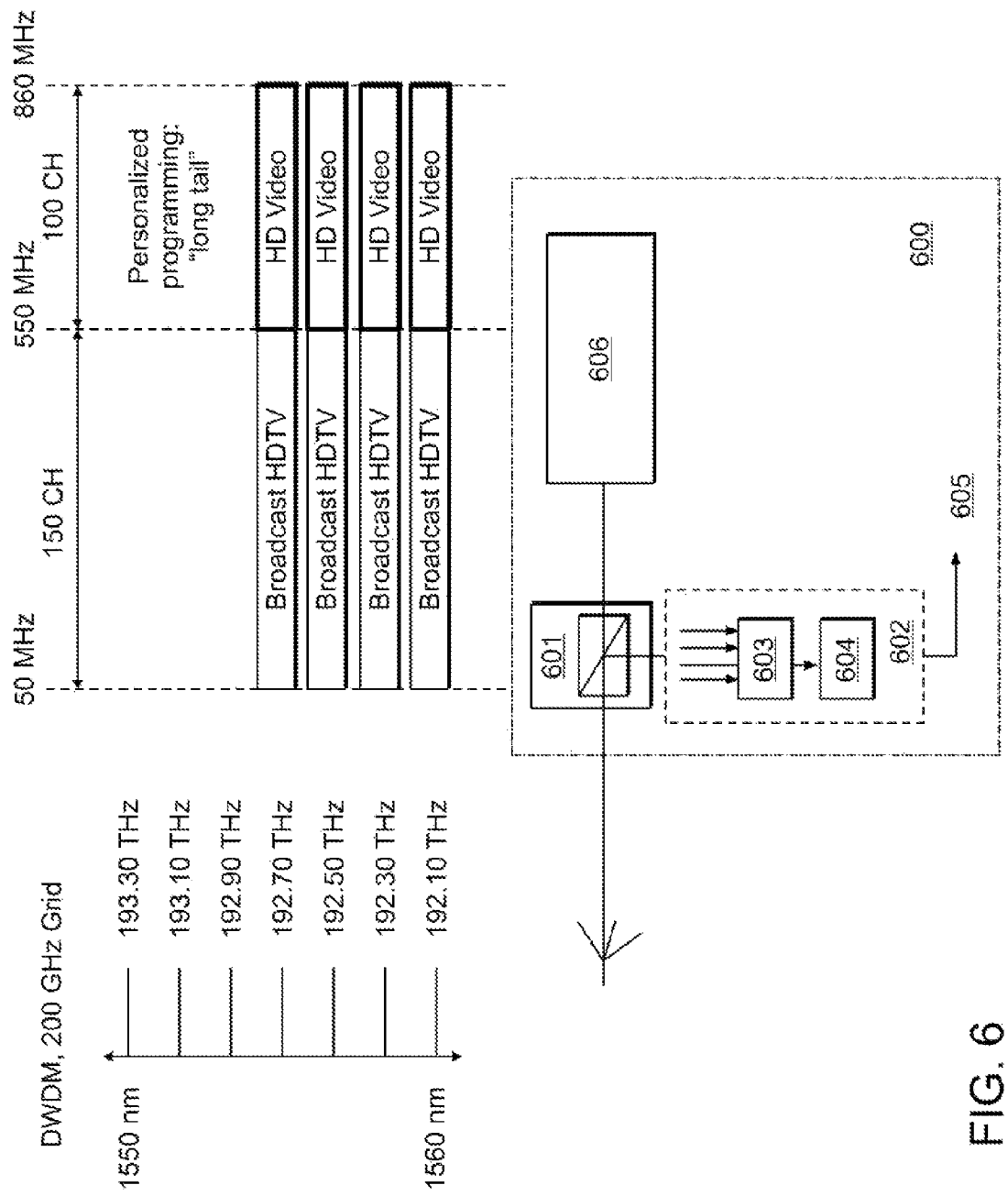
FIG. 6 shows an embodiment of an optical network unit that provides subscribers with optional personalized high-definition (HD) video channels in addition to standard broadcast channels.

FIG. 6 shows an embodiment of an optical network unit that provides subscribers with optional personalized high-definition (HD) video channels in addition to standard broadcast channels. The optical network unit 600 consists of an enhancement band splitter 601, a diplexer 606 and a wavelength selectable photodiode 602 with integrated tunable filter 603 and receiver 604. Signals from the receiver 604 may be output via a coaxial connection 605.

One method of operation for the embodiment of the optical network unit shown in FIG. 6 allows one wavelength to be shared among all subscribers that contains a standard package of broadcast channels. In the example shown in FIG. 6, each of 32 subscribers may choose up to 3 channels of personalized video, which requires only one wavelength. More than 3 personalized channels per subscriber will require the addition of wavelengths to provide sufficient bandwidth as shown in this example. The diplexer is used to handle standard data services as well as configuration and OLT communication tasks. Such a configuration allows highly personalized video content to be dynamically selected by and delivered to subscribers.

Figure 7:
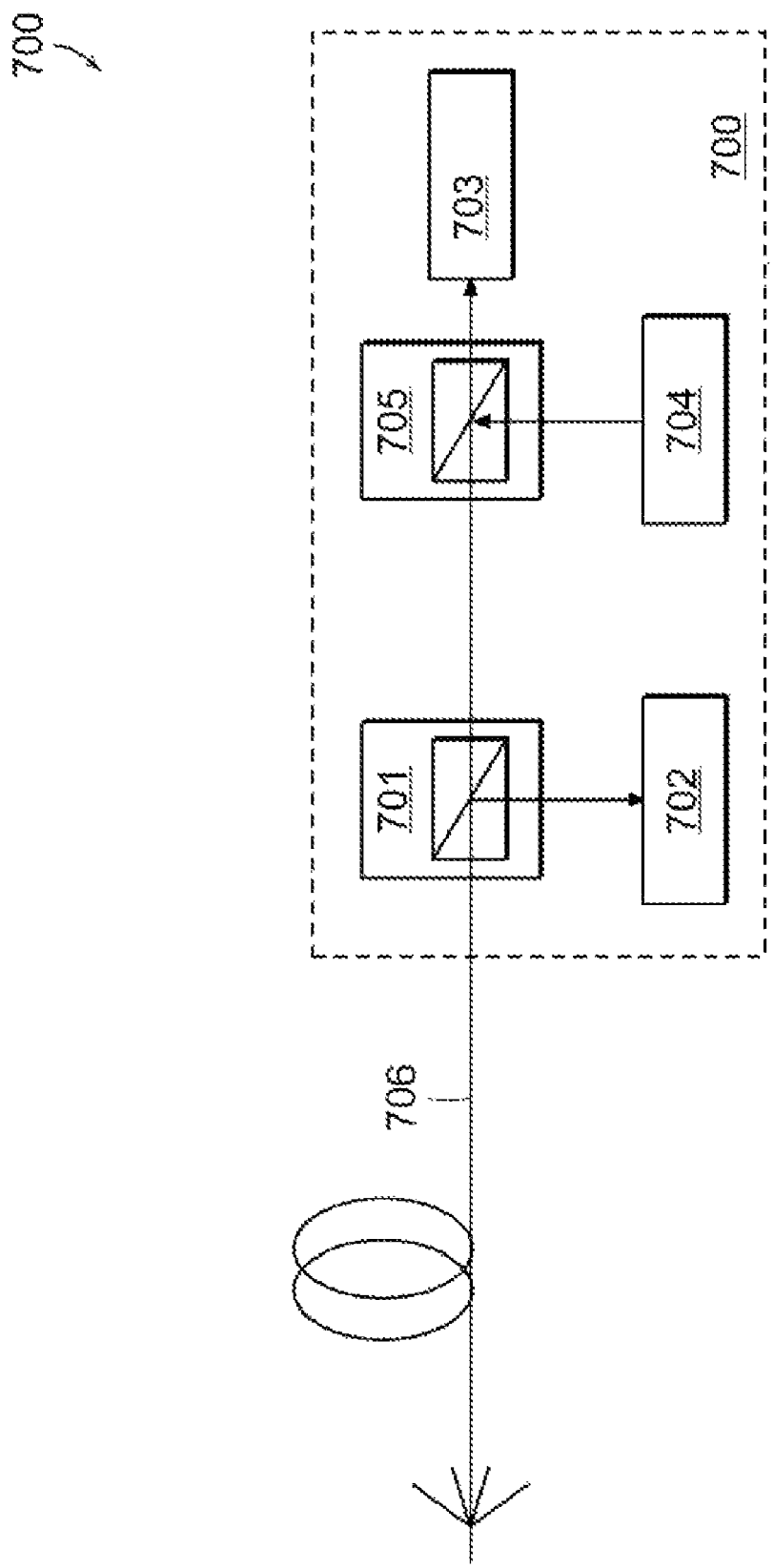
FIG. 7 illustrates a tunable-receiver multiplexer comprising integrated wavelength selectable photodiodes according to the present invention.

FIG. 7 illustrates a tunable-receiver multiplexer 700 comprising integrated wavelength selectable photodiodes according to the present invention. The tunable multiplexer 700 includes an input/output port 706 and first dichroic beam splitter 701 that splits the input optical beam into two wavelength ranges. In addition, the tunable multiplexer 700 includes a second beam splitter 705 that passes the input optical signal and transmits an output optical signal.

In addition, the tunable-receiver multiplexer 700 includes a first 702 and a second integrated wavelength selectable photodiode 703 according to the present invention. These integrated wavelength selectable photodiodes 702, 703 replace static receivers in many known multiplexers. In addition, the tunable-receiver multiplexer 700 includes a transmitter 704. The tunable-receiver multiplexer 700 is commonly known as a triplexer because it processes three signals. However, one skilled in the art will appreciate that a tunable-receiver multiplexer according to the present invention can process any number of signals.

Figure 8:
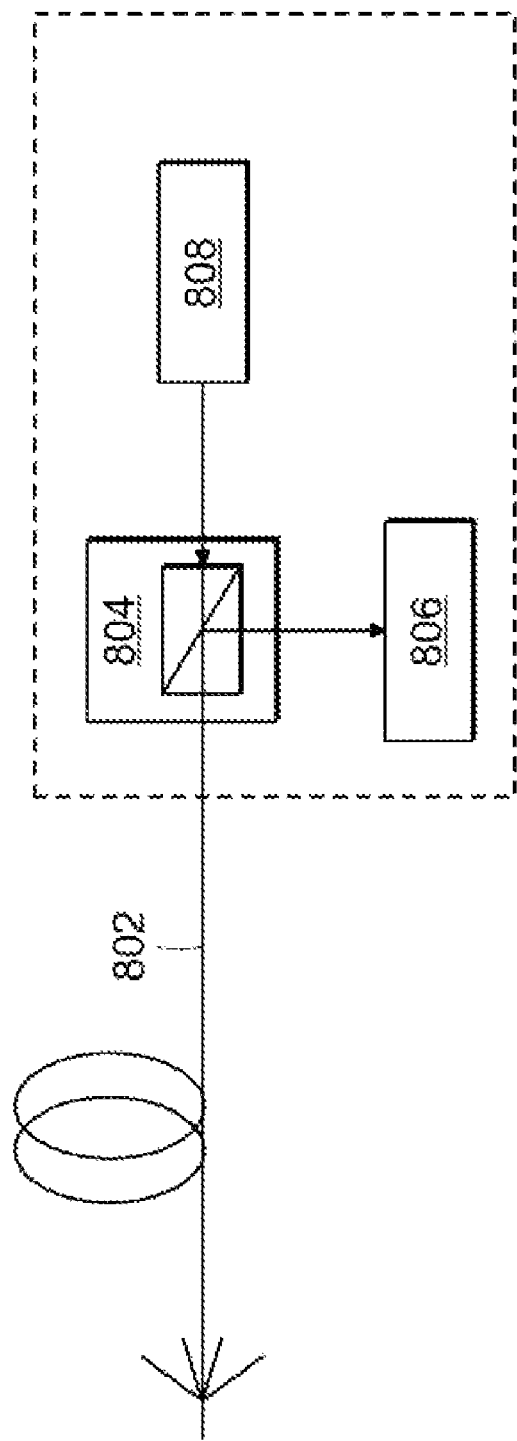
FIG. 8 illustrates a tunable diplexer comprising an integrated wavelength selectable photodiode according to the present invention.

FIG. 8 illustrates a tunable diplexer 800 comprising an integrated wavelength selectable photodiode according to the present invention. The diplexer 800 is one embodiment of the tunable-receiver multiplexer 700 that was described in connection with FIG. 7. The diplexer includes an input output port 802 and a beam splitter 804. In addition, the diplexer includes an integrated wavelength selectable photodiode 806 and a transmitter that are optically coupled to respective ports of the beam splitter 804.

Such a tunable diplexer 800 is well suited for FTTX applications and can directly replace known static diplexers to allow network provisioning. Because the integrated wavelength selectable photodiode 806 can be manufactured in a standard TO46 package, it can be drop-in replacement for prior art static receives.

EQUIVALENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the invention.

What is claimed is:

1. An integrated wavelength selectable high-speed data receiver comprising:
   a. a device package having an input that receives an optical signal;
   b. a set-and-hold, thermally tunable thin-film filter positioned in the device package, the set-and-hold, thermally tunable thin-film filter having a blocking material that reduces the amount of unfiltered radiation passing through the thin-film filter, and having an input that is optically coupled to the input of the device package, the set-and-hold thermally tunable thin-film filter having an optical bandwidth wide enough to pass received data and, narrow enough to substantially reject data encoded on adjacent channels, and being locked to a single channel and passing to an output light encoded with data from the single optical channel to which the set-and-hold, thermally tunable thin-film filter is set and rejecting data encoded on adjacent channels;
   c. an optical element that collimates an incident optical beam onto the input of the set-and-hold, thermally tunable thin-film filter; and
   d. a high-speed detector that is positioned in the device package and having an input that is optically coupled directly to the output of the set-and-hold, thermally tunable thin-film filter, the detector detecting data that is encoded on the single optical channel as a function of time which is passed by the thermally tunable thin-film filter.

2. The integrated wavelength selectable data receiver of claim 1 wherein the device package comprises a TO46 package.

3. The integrated wavelength selectable data receiver of claim 1 wherein a size of the device package is less than or equal to a TO46 package size.

4. The integrated wavelength selectable data receiver of claim 1 wherein the set-and-hold, thermally tunable thin-film filter is operated in a locked mode and the filter transmission wavelength is optimized using dither control.

5. The integrated wavelength selectable data receiver of claim 1 wherein the thermally tunable thin-film filter is operated in a scanning mode which scans a predetermined spectral range in order to determine wavelengths at which optical signals are present.

6. The integrated wavelength selectable data receiver of claim 1 wherein the set-and-hold, thermally tunable thin-film filter comprises a filter element that is positioned between a heating element and a detector.

7. The integrated wavelength selectable data receiver of claim 1 wherein the set-and-hold, thermally tunable thin-film filter has an insertion loss that is less than 3.5 dB.

8. The integrated wavelength selectable data receiver of claim 1 wherein the optical element comprises a single lens or mirror.

9. The integrated wavelength selectable data receiver of claim 1 wherein the optical element is positioned in the device package proximate to the input of the set-and-hold, thermally tunable thin-film filter.

10. The integrated wavelength selectable data receiver of claim 1 wherein the optical element is positioned outside the device package proximate to the input of the device package.

11. An integrated wavelength selectable high-speed data receiver comprising:
   a. a device package having an input that receives an optical signal;

b. a set-and-hold, thermally tunable thin-film filter comprising a filter element and heater that are positioned in the device package with a blocking material that reduces the amount of unfiltered radiation passing through the thin-film filter, and having an input that is optically coupled to the input of the device package, the set-and-hold, thermally tunable thin-film filter having a bandwidth wide enough to pass received data and narrow enough to substantially reject data encoded on adjacent channels, and being locked to a single channel and passing to an output light encoded with data from a single optical channel to which the set-and-hold, thermally tunable thin-film filter is set and rejecting data encoded on adjacent channels; and c. a high-speed detector having a bandwidth that is sufficient to detect data within the single optical channel and having an input that is optically coupled directly to the output of the set-and-hold, thermally tunable thin-film filter, the detector being positioned in the device package proximate to the filter element to reduce thermal coupling with the heater in order to minimize generation of thermal noise while detecting data that is encoded on the single optical channel as a function of time which is passed by the thermally tunable thin film filter.

12. The integrated wavelength selectable data receiver of claim 11 further comprising an optical element that collimates an incident optical beam onto the input of the set-and-hold, thermally tunable thin-film filter.

13. The integrated wavelength selectable data receiver of claim 12 wherein the optical element is positioned in the device package proximate to the input of the set-and-hold, thermally tunable thin-film filter.

14. The integrated wavelength selectable data receiver of claim 12 wherein the optical element is positioned outside the device package proximate to the input of the device package.

15. The integrated wavelength selectable data receiver of claim 11 wherein a size of the device package is less than or equal to a TO46 package size.

16. The integrated wavelength selectable data receiver of claim 11 wherein the set-and-hold, thermally tunable thin-film filter is operated in a locked mode and the filter transmission wavelength is optimized using dither control.

17. The integrated wavelength selectable data receiver of claim 11 wherein the thermally tunable thin-film filter is operated in a scanning mode which scans a predetermined spectral range in order to determine wavelengths at which optical signals are present.

18. A method of receiving high-speed data from a single optical channel that is encoded on an optical signal, the method comprising:

d. collimating an input optical signal into a set-and-hold, thermally tunable thin-film filter having a bandwidth wide enough to pass received data and narrow enough to substantially reject data encoded on adjacent channels;

e. adjusting a temperature of the thermally tunable set-and-hold, thin film filter so that it passes to an output light encoded with data from a single optical channel to which the set-and-hold, thin film filter is set and rejects data encoded on adjacent channels;

f. locking the set-and-hold, thermally tunable thin-film filter to the single channel;

g. directly coupling the filtered optical signal to an optical detector integrated in a device package with the set-and-hold, thermally tunable thin-film filter while reducing the amount of unfiltered radiation that reaches the photodiode detector with a blocking layer; and h. detecting the filtered optical data signal that is encoded on the single optical channel as a function of time with an optical detector having a bandwidth that is sufficient to detect high-speed data within the single optical channel, the detector being positioned to reduce the detected amount of thermal radiation and spectral noise which was generated by the thermally tunable thin-film filter.

19. The method of claim 18 wherein the adjusting the temperature of the set-and-hold, thermally tunable thin-film filter comprises locking the set-and-hold, thermally tunable thin-film filter at a center wavelength which allows the maximum amount of light from the single channel to pass the set-and-hold, thermally tunable thin-film filter.

20. The method of claim 18 wherein the adjusting the temperature of the set-and-hold, thermally tunable thin-film filter comprises scanning the temperature of the set-and-hold, thermally tunable thin-film filter to vary the center wavelength of the tunable thin-film filter.

21. A tunable-receiver multiplexer comprising:

a. a first beam splitter having a first port that receives and transmits an optical signal into and out of the multiplexer;

b. an integrated wavelength selectable high-speed data receiver having a blocking material that reduces the amount of unfiltered radiation passing through the thin-film filter, and having an input that is optically coupled to a second port of the first beam splitter, the integrated wavelength selectable high-speed data receiver comprising a set-and-hold, thermally tunable thin-film filter having a bandwidth wide enough to pass received data and narrow enough to substantially reject data encoded on adjacent channels, and that passes to an output light encoded with data from a single optical channel to which the set-and-hold, thermally tunable thin-film filter is set and rejecting data encoded on adjacent channels;

c. a second beam splitter having a first port that is optically coupled to a third port of the first beam splitter; and d. an optical transmitter having an output that is optically coupled to a second port of the second beam splitter.

22. The tunable-receiver multiplexer of claim 21 wherein the integrated wavelength selectable data receiver is positioned within a device package having a size that is less than or equal to a size of a TO46 package.

23. The tunable-receiver multiplexer of claim 21 further comprising a second integrated wavelength selectable data receiver having an input that is optically coupled to a second port of the second beam splitter, the second integrated wavelength selectable data receiver comprising a set-and-hold, thermally tunable thin-film filter that passes a second predetermined center wavelength at an output; and a detector having an input that is optically coupled directly to the output of the set-and-hold, thermally tunable thin-film filter.

24. The tunable-receiver multiplexer of claim 21 wherein the tunable-receiver multiplexer comprises a diplexer.

25. The tunable-receiver multiplexer of claim 21 wherein the tunable-receiver multiplexer comprises a triplexer.

* * * * *